BATHYTHERMOGRAPHIC PROBE FOR UNIFORM DESCENT RATE
Filed Oct. 14, 1968
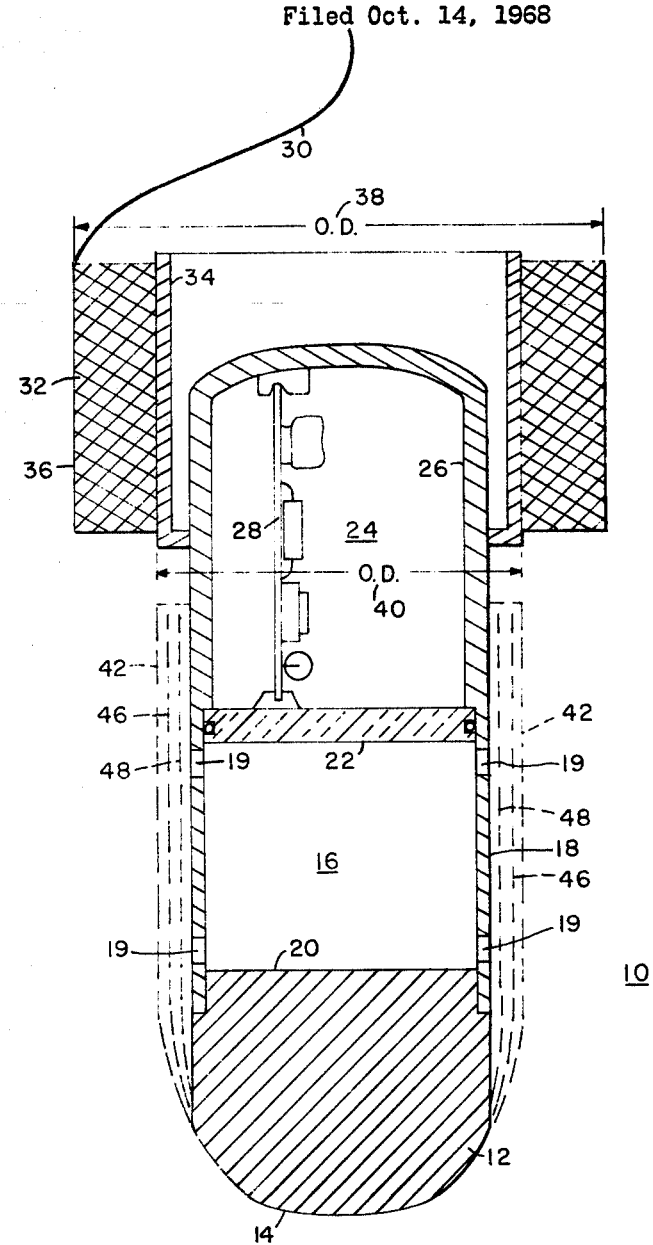

United States Patent Office
3,511,092
Patented May 12, 1970

3,511,092
BATHYTHERMOGRAPHIC PROBE FOR UNIFORM DESCENT RATE
Roger I. Saunders, Hollis, N.H., assignor to Sanders Associates, Inc., Nashua, N.H., a corporation of Delaware
Filed Oct. 14, 1968, Ser. No. 767,418
Int. Cl. G01k 13/00
U.S. Cl. 73—344         3 Claims

ABSTRACT OF THE DISCLOSURE

A probe, adaptable for sensing a property of a fluid relative to a given dimension, whose buoyancy varies as a function of wire carried and payed out by the probe as it travels along that dimension. Means are provided for varying the velocity of the probe by varying the drag force on it as a function of the wire payed out to compensate for the variation in velocity of the probe caused by the variation in buoyancy thereof as the wire is payed out.

BACKGROUND OF THE INVENTION

This invention relates to a probe in which the variation in buoyancy caused by wire payed out as the probe moves through a fluid medium is compensated for by a variation in drag force to maintain more uniform velocity of the probe.

Conventional probes such as those of negative buoyancy used in oceanographic research have inherently non-uniform descent rates because the weight loss of the wire payed out as the probe decends decreases the negative buoyancy of the probe which in turn decreases the velocity of the probe. Probes having constant descent rates are desirable in such research because they enable the recording equipment to correlate incoming data from the probe with the depth at which the data was sensed with greater assurance of correctness.

Attempts to minimize this non-uniformity in such probes have included the use of sufficient additional ballast in the probe to render negligible the loss of weight, thus the change in buoyancy, caused by the paying out of wire of negative buoyancy and also have included the use of wire of neutral buoyancy. The former approach results in a probe of increased weight; and the latter requires a probe of increased volume to accommodate the wire of neutral buoyancy and of increased weight to offset the neutral buoyancy of the wire.

Similar problems may be encountered in attempts to minimize this non-uniformity in probes of positive buoyancy dispatched upwardly through the water from submerged vessels.

SUMMARY OF THE INVENTION

It is therefore a primary object of this invention to provide a probe of reduced size and weight having an inherently uniform rate of motion through a fluid in which it is traveling.

It is a further object of this invention to provide such a probe of negative buoyancy having an inherently uniform descent rate through the fluid.

It is a further object of this invention to provide such a probe in which the inherently uniform descent rate is achieved by varying the drag force on the probe to compensate for the variation in buoyancy as the wire is payed out from the probe.

The invention may be accomplished by a probe of negative buoyancy having the wire of negative buoyancy to be payed out from it wound in a spool carried on the probe so as to produce a drag force on the spool and probe. The spool is dimensioned to produce a drag force which decreases as the wire is payed out to compensate for the decrease in negative buoyancy of the probe as the wire is payed out, thereby maintaining the probe descent at a uniform rate.

DISCLOSURE OF PREFERRED EMBODIMENT

Other objects, features and advantages will occur from the following description of a preferred embodiment and the accompanying drawing, in which is shown a longitudinal sectional view of a bathythermographic probe according to this invention.

In accordance with one embodiment of the invention the negatively buoyant wire is wound in the shape of a toroidal spool externally mounted about the exterior circumference of the negatively buoyant probe. As the probe descends the wire is payed out as it unwinds from the outer surface of the spool decreasing the horizontal cross sectional or drag area of the spool. As that drag area of the spool is reduced the drag force on it and on the entire probe is reduced. The decrease in drag force permits an increase in probe velocity as a function of the wire payed out and that increase in velocity is equal to the decrease in probe velocity produced by the decrease in negative buoyancy of the probe caused by the loss of the weight of the negative buoyant wire payed out.

The result is a probe, having an inherently uniform descent rate, contained in a small package of low weight.

In applications where it is necessary or desirable that the wire spool be internally mounted and thus may not form a considerable portion of the drag force on the probe a compressible ring on the probe which forms a substantial portion of the drag area may be used on the probe. The compressible ring, which may be made of elastic, closed cell foam or the like, becomes increasingly more compressed as the descending probe encounters increasing pressure. As the ring is compressed its volume decreases and drag area decreases which in turn reduces the drag force on the probe.

In the case of a positive buoyancy probe which ascends rather than decends through the fluid, the unwinding of a negatively buoyant wire would decrease the negative buoyancy but also decrease the drag force so that the two actions do not compensate for one another but act additively to increase the ascent rate. In such a case the decreasing pressure of the fluid or the pay out of wire from the spool may be used to actuate other means for inireasing the drag force, and the wire spool itself need not be a considerable portion of the overall probe drag force.

There is shown in the drawing a probe 10 with a cylindrical lead nose piece 12, having a rounded leading edge 14. A free flooding chamber 16 is formed by cylindrical wall 18 having flooding holes 19 between the upper end 20 of nose piece 12 and disc 22. The water-tight instrumentation chamber 24 formed above disc 22 by the domed cylindrical member 26 contains electronic equipment 28 associated with sensing and measuring devices (not shown) which may be carried by probe 10. Information sensed by such devices is converted to electrical signals by equipment 28 and transmitted back to the receiver over the wire 30. A transmitter may be incorporated into a surface float connected to wire 30 to transmit the signals to aircraft or distant ships.

Wire 30 is wound in a toroidal spool 32 on mandrel 34 mounted at the top of the probe 10 on the domed cylindrical member 26. The wire lead between spool 32 and electronic equipment 28 is not shown. As wire 30 is payed out from the outer surface 36 of spool 32 during the descent of probe 10, the outer diameter (O.D.) 38 of spool 32 decreases resulting in a decrease in the drag area of probe 10 and producing a reduction of the drag force on probe as a function of wire pay-out. The minimum drag force is a function of the outer diameter 40 of the mandrel 34.

Good results have been achieved with a probe three and one half inches in length, weighing less than two pounds, and using 1400 feet of two-conductor signal wire wound in a spool having an outer diameter of one and three quarter inches and a width of one inch.

Alternatively, a foam rubber ring 42, shown in phantom in the drawing, may be mounted on a modified form of probe 10 having a nose piece behind which ring 42 is nested. In such a modified form, mandrel 34 and spool 32 are removed and a spool of wire may be contained within the probe to prevent it from contributing to the drag force. As the probe descends, then, the foam rubber ring 42 is compressed, phantom lines 46, 48, to the body of the probe thereby reducing the drag force on the probe.

What is claimed is:

1. An improved probe for sensing a property of fluid relative to a given dimension, said probe having sensing means carried thereby and a wire operatively connecting said sensor to a receiver, said wire being payed out from said probe as said probe travels along the dimension through said fluid, the buoyancy of the probe varying as a function of the amount of wire payed out, the improvement comprising means for varying the outer circumference of a horizontal cross section of said probe to thereby vary the drag force thereon, the variation in drag force substantially compensating for the variation in velocity of said probe caused by the said variation in buoyancy as said wire is payed out.

2. Apparatus as recited in claim 1 wherein said means for varying the outer circumference of a horizontal cross section comprises said wire being wound as a toroidal spool externally mounted about the exterior circumference of said probe, and said wire is paid out from the outer surface of said pool as said probe travels along said dimension.

3. Apparatus as recited in claim 1 wherein said means for varying the outer circumference of a horizontal cross section comprises a compressible member providing a substantial portion of the drag force on said probe and which becomes increasingly compressed by the increasing pressure exerted on the descending probe by said fluid.

References Cited

UNITED STATES PATENTS

| | | | |
|---|---|---|---|
| 3,273,111 | 9/1966 | Parenti | 73—170 |
| 3,298,222 | 1/1967 | Costello | 73—170 |

LOUIS R. PRINCE, Primary Examiner

D. E. CORR, Assistant Examiner

U.S. Cl. X.R.

73—170